US012607890B2

(12) United States Patent
Yamamoto et al.

(10) Patent No.: US 12,607,890 B2
(45) Date of Patent: *Apr. 21, 2026

(54) DISPLAY AND ELECTRONIC APPARATUS

(71) Applicant: Saturn Licensing LLC, New York, NY (US)

(72) Inventors: Takeshi Yamamoto, Tokyo (JP); Kouki Miura, Tokyo (JP); Tomoyuki Yoshimatsu, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 17/475,976

(22) Filed: Sep. 15, 2021

(65) Prior Publication Data

US 2022/0004059 A1      Jan. 6, 2022

Related U.S. Application Data

(63) Continuation of application No. 16/080,798, filed as application No. PCT/JP2017/005841 on Feb. 17, 2017, now Pat. No. 11,150,516.

(30) Foreign Application Priority Data

Apr. 5, 2016    (JP) ................................. 2016-075681

(51) Int. Cl.
G02F 1/13357      (2006.01)
F21V 8/00           (2006.01)
G02F 1/1335        (2006.01)

(52) U.S. Cl.
CPC ..... G02F 1/133615 (2013.01); G02B 6/0036 (2013.01); G02B 6/0038 (2013.01);
(Continued)

(58) Field of Classification Search
CPC ........... G02F 1/133615; G02F 2202/28; G02F 1/133504; G02B 6/0036; G02B 6/0038; G02B 6/0043; G02B 6/0016
See application file for complete search history.

(56) References Cited

U.S. PATENT DOCUMENTS 6,025,897 A     2/2000  Weber et al.
7,488,104 B2   2/2009  Hamada et al.
(Continued)

FOREIGN PATENT DOCUMENTS

CN          1530713 A   *  9/2004  ........... G02B 6/0053
CN        104965344 B      9/2018
(Continued)

OTHER PUBLICATIONS

Owen Bishop, Understand Electronics (2d ed.), 141-143.*
(Continued)

*Primary Examiner* — Jia X Pan
(74) *Attorney, Agent, or Firm* — Richard Laperuta

(57)      ABSTRACT

A display according to an embodiment of the disclosure includes a light-emitting device and a display panel unit. The light-emitting device includes a light guide plate, a light source, a reflecting plate, and a dot pattern. The light guide plate has a light-outputting surface including a plurality of band-shaped projections extending in a direction orthogonal to the light-entering end surface. The light source is disposed along the light-entering end surface. The reflecting plate is disposed to face the rear surface of the light guide plate. The dot pattern fixes the light guide plate and the reflecting plate to each other and serves as a light scatterer. The display panel unit includes a display panel, an optical sheet, and a fixing layer. The fixing layer adheres or sticks the display panel and the optical sheet to each other and serves as a light diffuser.

18 Claims, 4 Drawing Sheets

(52) U.S. Cl.
CPC ......... *G02B 6/0043* (2013.01); *G02B 6/0055* (2013.01); *G02F 1/133504* (2013.01); *G02F 2202/28* (2013.01)

(56) References Cited

U.S. PATENT DOCUMENTS

| | | | |
|---|---|---|---|
| 11,150,516 B2* | 10/2021 | Yamamoto | F21S 2/00 |
| 2003/0117790 A1* | 6/2003 | Lee | G02B 6/0051 |
| | | | 362/330 |
| 2003/0137821 A1 | 7/2003 | Gotoh et al. | |
| 2003/0174492 A1 | 9/2003 | Ohkawa | |
| 2004/0042233 A1 | 3/2004 | Suzuki et al. | |
| 2006/0039670 A1 | 2/2006 | Feng et al. | |
| 2006/0104092 A1* | 5/2006 | Feng | G02B 6/0038 |
| | | | 362/626 |
| 2009/0268484 A1 | 10/2009 | Kim et al. | |
| 2010/0014276 A1* | 1/2010 | Jang | G02B 6/0023 |
| | | | 362/97.3 |
| 2010/0165238 A1* | 7/2010 | Kajita | G02F 1/133603 |
| | | | 349/62 |
| 2011/0090427 A1 | 4/2011 | Ohue et al. | |
| 2012/0147627 A1 | 6/2012 | Pan | |
| 2013/0148056 A1 | 6/2013 | Hineno et al. | |
| 2013/0271700 A1* | 10/2013 | Nakamura | G02B 6/0068 |
| | | | 349/65 |
| 2013/0271961 A1 | 10/2013 | Nakamura | |
| 2014/0116607 A1* | 5/2014 | Chiu | G02B 6/0065 |
| | | | 156/239 |
| 2014/0320784 A1 | 10/2014 | Kweon et al. | |
| 2015/0346553 A1 | 12/2015 | Chen et al. | |

| | | | |
|---|---|---|---|
| 2016/0018692 A1* | 1/2016 | Park | G02B 6/0065 |
| | | | 445/25 |
| 2016/0299341 A1* | 10/2016 | Yoshida | G02F 1/1339 |
| 2017/0212293 A1* | 7/2017 | Kim | G02B 6/005 |

FOREIGN PATENT DOCUMENTS

| | | | |
|---|---|---|---|
| JP | H07161216 | | 6/1995 |
| JP | H11224519 | | 8/1999 |
| JP | H11295714 | | 10/1999 |
| JP | 2003511727 | | 3/2003 |
| JP | 2006221055 | | 8/2006 |
| JP | 2010146784 | | 7/2010 |
| JP | 2011039173 A | | 2/2011 |
| JP | 2011123476 A | | 6/2011 |
| JP | 2012124162 A | | 6/2012 |
| JP | 2012208212 | | 10/2012 |
| JP | 2012252340 | | 12/2012 |
| JP | 2013093195 A | | 5/2013 |
| JP | 2013093295 | | 5/2013 |
| JP | 2013211217 A | * 10/2013 |
| JP | 2014175057 A | | 9/2014 |
| JP | 2015118272 A | | 6/2015 |
| WO | 2010007716 | | 1/2010 |
| WO | 2013122156 | | 8/2013 |

OTHER PUBLICATIONS

Rob Toulson & Tim Wilmshurst, Fast and Effective Embedded Systems Design, 8.1.1.*
International Search Report corresponding to PCT/JP2017/005841, dated Apr. 25, 2017, (2 pgs.).

* cited by examiner

[ FIG. 1 ]
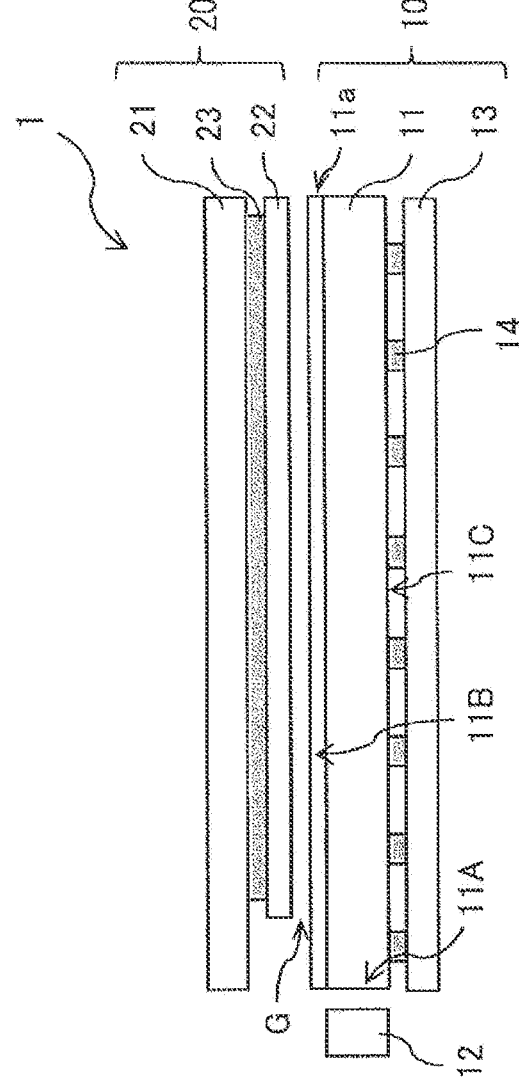

[ FIG. 2 ]
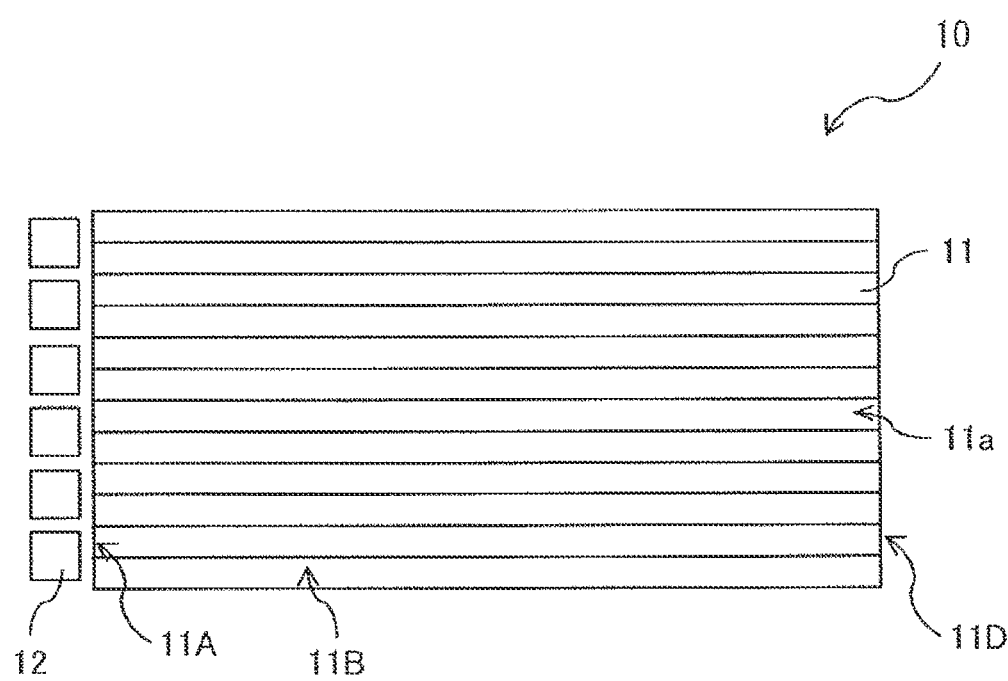
[ FIG. 3 ]
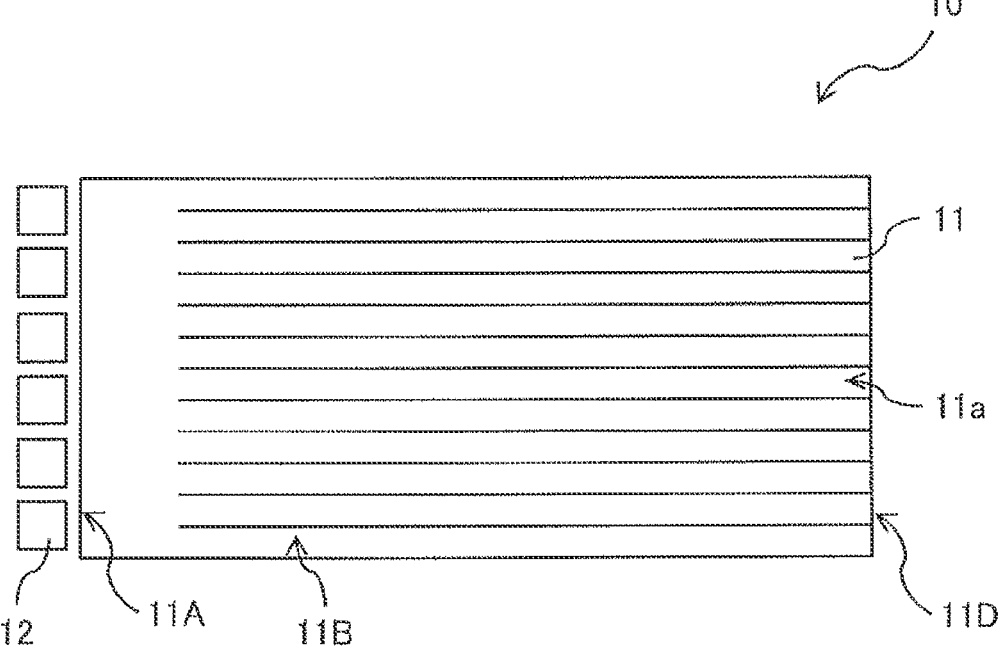

[ FIG. 4 ]
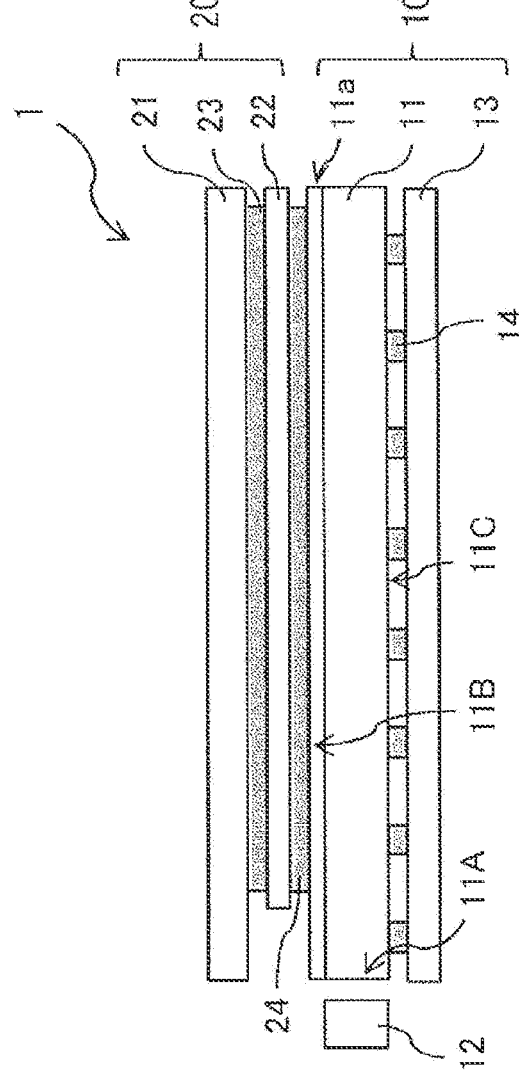

[ FIG. 5 ]
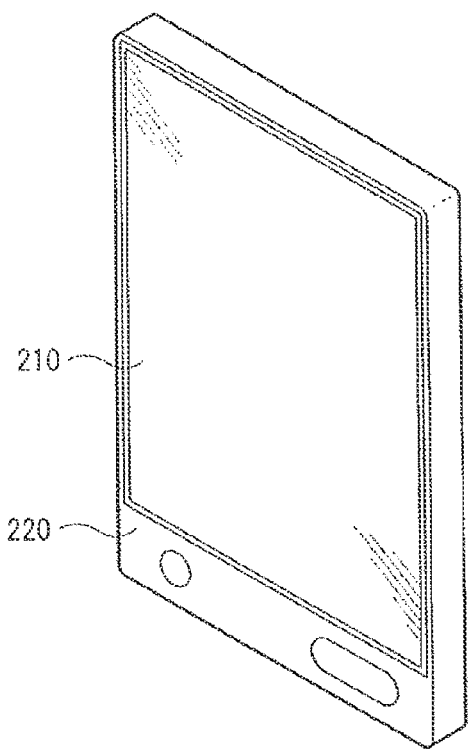
[ FIG. 6 ]
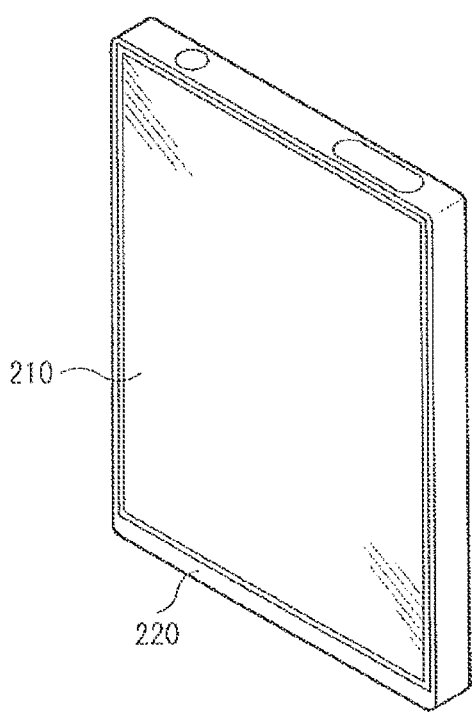

DISPLAY AND ELECTRONIC APPARATUS

CROSS-REFERENCE TO RELATED APPLICATIONS

The present application is a continuation of U.S. patent application Ser. No. 16/080,798, filed on Aug. 29, 2018, which is a national phase entry under 35 U.S.C. § 371 of International Application No. PCT/JP2017/005841, filed Feb. 17, 2017, which claims the priority from Japanese Patent Application No. 2016-075681, filed in the Japanese Patent Office on Apr. 5, 2016, the disclosures of which are hereby incorporated herein by reference.

TECHNICAL FIELD

The present disclosure relates to a display and an electronic apparatus that each include a light-emitting device of an edge-light method.

BACKGROUND ART

In recent years, a light-emitting device of an edge-light method that is suitable for reduction in thickness has been widely used as a backlight of a display panel (for example, see PTL 1).

CITATION LIST

Patent Literature

PTL 1: Japanese Unexamined Patent Application Publication No. 2013-93195

SUMMARY OF THE INVENTION

Meanwhile, in a display provided with the above-described light-emitting device, further reduction in thickness and manufacturing costs has been desired. It is accordingly desirable to provide a display that allows for further reduction in thickness and manufacturing costs, and an electronic apparatus that includes such a display.

A display according to an embodiment of the present disclosure includes: a light-emitting device that outputs illuminating light; and a display panel unit that is disposed to overlap the light-emitting device and displays an image by utilizing the illuminating light. The light-emitting device includes a light guide plate, a light source, and a reflecting plate. Here, the light guide plate has a light-entering end surface, a light-outputting surface including a plurality of band-shaped projections extending in a direction orthogonal to the light-entering end surface, and a rear surface facing the light-outputting surface. The light source is disposed along the light-entering end surface. The reflecting plate is disposed to face the rear surface of the light guide plate. The light-emitting device further includes a dot pattern disposed in contact with the rear surface and the reflecting plate. The dot pattern fixes the light guide plate and the reflecting plate to each other, and serves as a light scatterer. The display panel unit includes a display panel and an optical sheet. The display panel displays the image by modulating the illuminating light. The optical sheet is disposed between the display panel and the light-outputting surface of the light guide plate. The display panel unit further includes a fixing layer disposed in contact with the display panel and the optical sheet. The fixing layer adheres or sticks the display panel and the optical sheet to each other, and serves as a light diffuser.

An electronic apparatus according to an embodiment of the present disclosure includes the above-described display.

In the display and the electronic apparatus according to the respective embodiments of the present disclosure, the reflecting plate is bonded to the rear surface of the light guide plate by the dot pattern serving as the light scatterer. This allows for omission of a diffuser plate, and integrates the reflecting plate with the light guide plate. Further, in the disclosure, the plurality of band-shaped projections extending in the direction orthogonal to the light-entering end surface are provided on the light-outputting surface of the light guide plate. This allows for omission of a prism sheet, and integrates the plurality of band-shaped projections with the light guide plate. Further, in the present disclosure, the optical sheet is bonded to the rear surface of the display panel by the fixing layer serving as the light diffuser. This omits a diffuser sheet, and integrates the optical sheet with the display panel.

According to the display and the electronic apparatus of the respective embodiments of the present disclosure, the reflecting plate is bonded to the rear surface of the light guide plate by the dot pattern serving as the light scatterer, the plurality of band-shaped projections extending in the direction orthogonal to the light-entering end surface are provided on the light-outputting surface of the light guide plate, and further, the optical sheet is bonded to the rear surface of the display panel by the fixing layer serving as the light diffuser. This makes it possible to reduce the number of optical parts, as well as to reduce thickness since each of the dot pattern and the fixing layer has double functions. This allows for further reduction in thickness and manufacturing costs. It is to be noted that effects of the present disclosure are not necessarily limited to the effects described above, and may be any of the effects described herein.

BRIEF DESCRIPTION OF DRAWINGS

FIG. 1 is a cross-sectional view of an example of an overall configuration of a display according to an embodiment of the present disclosure.

FIG. 2 is a plan view of a top-surface configuration example of a light-emitting device illustrated in FIG. 1.

FIG. 3 is a plan view of a top-surface configuration example of the light-emitting device illustrated in FIG. 1.

FIG. 4 is a cross-sectional view of a modification example of an overall configuration of the display illustrated in FIG. 1.

FIG. 5 is a perspective view of an external appearance of a tablet terminal apparatus (an application example 1) mounted with the display of the present disclosure.

FIG. 6 is a perspective view of an external appearance of another tablet terminal apparatus (the application example 1) mounted with the display of the present disclosure.

MODES FOR CARRYING OUT THE INVENTION

Hereinafter, embodiments of the present disclosure are described in detail with reference to the drawings. It is to be noted that the description is given in the following order.
1. Embodiment (Display)
2. Application Examples of Display

1. Embodiment

[Configuration]

FIG. 1 is a cross-sectional view of an overall configuration example of a display 1 according to an embodiment of the present disclosure. The display 1 includes, for example, a light-emitting device 10 that outputs illuminating light, and a display panel unit 20 that is disposed to overlap the light-emitting device and displays an image by utilizing the illuminating light.

(Light-Emitting Device 10)

FIG. 2 is a plan view of a top-surface configuration example of the display 1. The light-emitting device 10 is a surface-emitting unit of an edge-light method. The light-emitting device 10 outputs the illuminating light from the top surface, and illuminates the display panel unit 20 with the illuminating light from behind. The light-emitting device 10 has, for example, a light guide plate 11, a plurality of light sources 12, a reflecting plate 13, and a dot pattern 14.

The light guide plate 11 guides light from the plurality of light sources 12 disposed on a light-entering end surface 11A to a light-outputting surface 11B. The light-entering end surface 11A is one of side surfaces of the light guide plate 11. The light-outputting surface 11B is a top surface of the light guide plate 11. The light guide plate 11 includes, for example, a glass substrate or a light-transmissive resin substrate. The light guide plate 11 has, for example, the light-entering end surface 11A, the light-outputting surface 11B, and a rear surface 11C facing the light-outputting surface 11B. The light guide plate 11 takes a shape corresponding to the display panel unit 20 disposed on the top surface of the light guide plate 11, for example, a cuboidal shape surrounded by the light-entering end surface 11A, the light-outputting surface 11B, and the rear surface 11C, for example.

The light guide plate 11 has a predetermined patterned shape on the light-outputting surface 11B. Specifically, the light-outputting surface 11B includes a plurality of band-shaped projections 11a extending in a direction orthogonal to the light-entering end surface 11A. Each of the plurality of band-shaped projections 11a takes a prism shape and narrows a divergent angle of each of the band-shaped projections 11a in an array direction (a direction orthogonal to an extending direction of each of the band-shaped projections 11a). In other words, the plurality of band-shaped projections 11a have a function similar to that of a prism sheet. The plurality of band-shaped projections 11a are formed by shaving off part of a top surface of a glass substrate, for example. Alternatively, the plurality of band-shaped projections 11a may be formed by pressing a metal mold having an inverted shape of the light-outputting surface 11B onto a light-transmissive resin substrate.

The plurality of band-shaped projections 11a are provided, for example, over the whole surface of the light-outputting surface 11B, and may extend over from an end, of the light-outputting surface 11B, that is in contact with the light-entering end surface 11A to an end, of the light-outputting surface 11B, that is in contact with an end surface 11D facing the light-entering end surface 11A, for example. The plurality of band-shaped projections 11a may be provided, for example, only on a portion of the light-outputting surface 11B. For example, as illustrated in FIG. 3, the plurality of band-shaped projections 11a may be provided to avoid a region, of the light-outputting surface 11B. in proximity to the light-entering end surface 11A.

The plurality of light sources 12 are disposed side by side along the light-entering end surface 11A, and configure a linear light source extending in a direction parallel to the light-entering end surface 11A. Each of the light sources 12 outputs light toward the light-entering end surface 11A, and includes, for example, a light-emitting device having a light-emitting spot on a surface facing the light-entering end surface 11A. Examples of such a light-emitting device include an LED or a laser diode (LD).

The reflecting plate 13 is disposed to face a backside (the rear surface 11B) of the light guide plate 11. The reflecting plate 13 returns light leaking out from behind the light guide plate 11 back to the light guide plate 11 side, and has functions of reflection, diffusion, scattering, etc., for example. This makes it possible to efficiently utilize light outputted from the light sources 12, and also helps to improve front luminance. The reflecting plate 13 includes, for example, foamed PET (polyethylene terephthalate), a silver-deposited film, a multi-layer film reflective film, a white PET film, etc.

The dot pattern 14 is disposed in contact with the rear surface 11C and the reflecting plate 13. The dot pattern 14 fixes the light guide plate 11 and the reflecting plate 13 to each other, and serves as a light scatterer. By adhering the light guide plate 11 and the reflecting plate 13 to each other by using the dot pattern 14, many portions of the rear surface 11C are brought into contact with an air layer. This allows total reflection conditions of the rear surface 11C to be mostly satisfied. Therefore, light is sufficiently propagated into the light guide plate 11, which suppresses unevenness of the luminance, etc. in the light-outputting surface 11B. Thus, the dot pattern 14 serves as a diffuser plate.

(Display Panel Unit 20)

The display panel unit 20 has a display panel 21, an optical sheet 22, and a fixing layer 23.

The display panel 21 displays an image by modulating illuminating light, and includes, for example, a liquid crystal panel. The optical sheet 22 is disposed between the display panel 21 and the light-outputting surface 11B, and includes, for example, a luminance-improving film. The luminance-improving film causes light outgoing from the light guide plate 11 in an oblique direction to rise in a front direction, thereby allowing for improvement of the front luminance Examples of the luminance-improving film include a prism sheet, a reflective polarization film, etc. The prism sheet causes light beams to converge by utilizing double reflection and light refraction that are achieved with the help of a prism, for example. The reflective polarization film performs S-wave recycling with use of light interference to convert incoming light into P waves. In addition to the luminance-improving film, the optical sheet 22 may include, for example, a diffuser plate, a diffuser sheet, etc.

The fixing layer 23 is disposed in contact with the display panel 21 and the optical sheet 22. The fixing layer 23 adheres or sticks the display panel 21 and the optical sheet 22 to each other, and serves as a light diffuser. The fixing layer 23 includes haze glue (diffusing glue), for example. Therefore, the fixing layer 23 serves as a diffuser sheet.

Here, in the present embodiment, a gap G is provided between the optical sheet 22 and the light-outputting surface 11B. Therefore, even in a case where the light guide plate 11 (specifically, the plurality of band-shaped projections 11a) includes a material with a relatively-low refractive index (for example, a resin material), a light-collecting function is sufficiently achievable in the array direction of each of the band-shaped projections 11a (the direction orthogonal to the extending direction of each of the band-shaped projections 11a) with the help of a refractive action based on a difference between the refractive index of the gap G and the refractive index of each of the band-shaped projections 11a.

It is to be noted that, for example, as illustrated in FIG. 4, a fixing layer 24 may be provided between the optical sheet 22 and the light-outputting surface 11B (at a place corresponding to the gap G). The fixing layer 24 may be disposed in contact with the optical sheet 22 and the light-outputting surface 11B. The fixing layer 24 fixes the optical sheet 22 and the light-outputting surface 11B to each other, and serves as a light scatterer. In this case, the light guide plate 11 (specifically, the plurality of band-shaped projections 11a) preferably includes a material (for example, glass material) with a refractive index higher than the refractive index of the fixing layer 24. Further, from a viewpoint of suppression of leakage of light from each of the band-shaped projections 11a, the parts in contact with the fixing layer 24 within each of the band-shaped projections 11a are preferably as few as possible. For example, only a tip part of each of the band-shaped projections 11a is preferably in contact with the fixing layer 24.

[Effects]

Next, a description is provided of effects of the display 1 of the present embodiment.

In the present embodiment, the reflecting plate 13 is bonded to the rear surface 11C of the light guide plate 11 by the dot pattern 14 serving as a light scatterer. This allows for omission of a diffuser plate, and integrates the reflecting plate 13 with the light guide plate 11. Further, in the present embodiment, the plurality of band-shaped projections 11a extending in the direction orthogonal to the light-entering end surface 11A are provided on the light-outputting surface 11B of the light guide plate 11. This allows for omission of a prism sheet, and integrates the plurality of band-shaped projections 11a with the light guide plate 11. Moreover, in the present embodiment, the optical sheet 22 is bonded to the rear surface of the display panel 21 by the fixing layer 23 serving as a light diffuser. This omits a diffuser sheet, and integrates the optical sheet 22 with the display panel 21.

Accordingly, in the present embodiment, it is possible to reduce the number of optical parts, as well as to reduce thickness since each of the dot pattern 14 and the fixing layer 23 has double functions. This allows for further reduction in thickness and manufacturing costs.

In the present embodiment, the optical sheet 22 includes the luminance-improving film. As a result, there is a possibility that the luminance-improving film and the plurality of band-shaped projections 11a will optically interfere with each other. In the present embodiment, however, the fixing layer 23 serving as the light scatterer is provided between the optical sheet 22 and the display panel 21. Therefore, the optical interference between the luminance-improving film and the plurality of band-shaped projections 11a is mitigated by the fixing layer 23. Consequently, it is possible to suppress unevenness of the luminance, etc. in the light-outputting surface 11B. Thus, in the present embodiment, the fixing layer 23 serves as the light scatterer, which allows for omission of a diffuser sheet. Accordingly, it is possible to further reduce thickness and manufacturing costs.

Further, in the present embodiment, the gap G is provided between the optical sheet 22 and the light-outputting surface 11B. Therefore, even in a case where the light guide plate 11 (specifically, the plurality of band-shaped projections 11a) includes a material (for example, a resin material) with a relatively-low refractive index, the light-collecting action is sufficiently achievable in the array direction of each of the band-shaped projections 11a (the direction orthogonal to the extending direction of each of the band-shaped projections

11a) with the help of a refractive action based on a difference between the refractive index of the gap G and the refractive index of each of the band-shaped projections 11a. Thus, in the present embodiment, each of the band-shaped projections 11a has the sufficient light-collecting function, which allows for omission of a prism sheet in the optical sheet 22. Accordingly, it is possible to further reduce thickness and manufacturing costs.

2. Application Examples of Display

Hereinafter, the description is provided of examples of application of the display 1 to electronic apparatuses. Examples of the electronic apparatuses include a television apparatus, a digital camera, a laptop personal computer, a mobile terminal apparatus such as a mobile phone, a video camera, etc. In other words, the display 1 is applicable to electronic apparatuses in every field in which an image signal inputted externally or generated internally is displayed as an image or a video picture.

FIG. 5 illustrates an external appearance of a tablet terminal apparatus to which the display 1 is applied. FIG. 6 illustrates an external appearance of another tablet terminal apparatus to which the display 1 is applied. Any of these tablet terminal apparatuses has, for example, a display section 210 and a non-display section 220, and the display section 210 is configured with use of the display 1.

The disclosure is described thus far with reference to the embodiment and application examples thereof; however, the disclosure is not limited to the above-described embodiment, etc., but various modifications may be made. It is to be noted that the effects described herein are merely exemplified. The effects of the disclosure are not limited to any of the effects described herein. The disclosure may have any effects other than the effects described herein.

Further, for example, the disclosure is configured as follows.

(1)

A display including:

a light-emitting device that outputs illuminating light; and a display panel unit that is disposed to overlap the light-emitting device and displays an image by utilizing the illuminating light, the light-emitting device including a light guide plate having a light-entering end surface, a light-outputting surface including a plurality of projections extending in a direction orthogonal to the light-entering end surface, and a rear surface facing the light-outputting surface, a light source disposed along the light-entering end surface, a reflecting plate disposed to face the rear surface, and a dot pattern disposed in contact with the rear surface and the reflecting plate, the dot pattern fixing the light guide plate and the reflecting plate to each other, and serving as a light scatterer, the display panel unit including a display panel that displays the image by modulating the illuminating light, an optical sheet disposed between the display panel and the light-outputting surface, and a fixing layer disposed in contact with the display panel and the optical sheet, the fixing layer adhering or sticking the display panel and the optical sheet to each other, and serving as a light diffuser.

(2)

The display according to (1), in which the optical sheet is a luminance-improving film.

(3)

The display according to (1) or (2), in which a gap is provided between the optical sheet and the light-outputting surface.

(4)

An electronic apparatus provided with a display, the display including:

a light-emitting device that outputs illuminating light; and a display panel unit that is disposed to overlap the light-emitting device and displays an image by utilizing the illuminating light, the light-emitting device including a light guide plate having a light-entering end surface, a light-outputting surface including a plurality of projections extending in a direction orthogonal to the light-entering end surface, and a rear surface facing the light-outputting surface, a light source disposed along the light-entering end surface, a reflecting plate disposed to face the rear surface, and a dot pattern disposed in contact with the rear surface and the reflecting plate, the dot pattern fixing the light guide plate and the reflecting plate to each other, and serving as a light scatterer, the display panel unit including a display panel that displays the image by modulating the illuminating light, an optical sheet disposed between the display panel and the light-outputting surface, and a fixing layer disposed in contact with the display panel and the optical sheet, the fixing layer adhering or sticking the display panel and the optical sheet to each other, and serving as a light diffuser.

This application claims the priority on the basis of Japanese Patent Application No. 2016-075681 filed on Apr. 5, 2016 with Japan Patent Office, the entire contents of which are incorporated in this application by reference.

Those skilled in the art could assume various modifications, combinations, subcombinations, and changes in accordance with design requirements and other contributing factors. However, it is understood that they are included within a scope of the attached claims or the equivalents thereof.

The invention claimed is:

1. A display comprising:

a light-emitting device that outputs illuminating light; and a display panel unit that is disposed to overlap the light-emitting device and displays an image by utilizing the illuminating light, wherein the light-emitting device comprises:

a light guide plate having a light-entering end surface, a light-outputting surface that includes a plurality of band-shaped projections in which the projections extend in a direction orthogonal to the light-entering end surface, and a rear surface that faces the light-outputting surface;

a light source disposed along the light-entering end surface, a reflecting plate disposed to face the rear surface, and a dot pattern disposed in contact with the rear surface and the reflecting plate in which the dot pattern fixes the light guide plate and the reflecting plate to each other by adherence and serves as a light scatterer, and wherein the display panel unit comprises:

a display panel that displays the image by modulating the illuminating light, an optical sheet disposed between the display panel and the light-outputting surface, wherein the optical sheet is a luminance-improving film, a fixing layer disposed in contact with the display panel and the optical sheet, the fixing layer adhering or sticking the display panel and the optical sheet to each other, and serving as a light diffuser; and a second fixing layer provided between and directly contacting the optical sheet and the light-outputting surface.

2. The display of claim 1, wherein the second fixing layer serves as a light scatter.

3. The display of claim 1, wherein the fixing layer is a haze glue.

4. The display of claim 3, wherein the second fixing layer serves as a light scatter.

5. The display of claim 4, wherein the plurality of projections includes a material with a refractive index higher than a refractive index of the second fixing layer.

6. The display of claim 4, wherein the fixing layer includes a function of mitigating optical interference between the luminance-improving film and the plurality of band-shaped projections.

7. The display of claim 1, wherein the luminance-improving film is a reflective polarization film.

8. The display of claim 7, wherein the reflective polarization film performs S-wave recycling with use of light interference to convert incoming light into P waves.

9. The display of claim 1, wherein the luminance-improving film is a prism sheet.

10. The display of claim 1, wherein the fixing layer serves as a light scatterer.

11. The display of claim 10, wherein the second fixing layer has a lower refractive index than a refractive index of the light guide plate.

12. The display of claim 1, wherein the band-shaped projections extend only partially across the light-outputting surface.

13. The display of claim 1, wherein the light-emitting device includes a plurality of light sources.

14. The display of claim 13, wherein the light guide plate is a glass substrate and the light sources are LEDs.

15. The display of claim 13, wherein the light guide plate is a resin substrate and the light sources are LEDs.

16. The display of claim 13, wherein the light sources are LEDs.

17. The display of claim 1, wherein the light guide plate is a resin substrate.

18. The display of claim 1, wherein the light guide plate is a glass substrate.

* * * * *